Inventor
John Baude
By Warren F. B. Lindsley
Attorney

United States Patent Office 3,123,813
Patented Mar. 3, 1964

3,123,813
PHASE SEQUENCE SENSING CIRCUIT
John Baude, Milwaukee, Wis., assignor to Allis-Chalmers Manufacturing Company, Milwaukee, Wis.
Filed Jan. 2, 1962, Ser. No. 163,672
6 Claims. (Cl. 340—248)

This invention relates to an electric sensing device and more particularly to a phase sequence sensing circuit.

The purpose of a phase sequence sensing circuit is to protect associated electrical equipment such as motors, transformers, etc. from, for example, incorrect phase rotation, under or over voltage and/or open circuit conditions in one or more phases of the energizing circuits for the protected equipment. Heretofore this type of protection has been provided, if at all, by complicated electro-mechanical devices.

In accordance with the invention claimed, a new and improved phase sequence sensing circuit is provided comprising in combination a source of voltage having three different terminals. These terminals are arranged in three different pairs forming a three phase system. Means are provided for sensing the voltage difference between at least two pairs of the voltage terminals. A load is connected between at least one pair of the two pairs of terminals. A controllable semiconductor comprising at least three elements is provided with means for connecting two of the elements in series with the load. Means are set forth for connecting one terminal of a third pair of the terminals to the third element of the semiconductor, and time delay means are connected between the third element and the other terminal of the third pair of terminals for controlling the load current.

It is, therefore, one object of this invention to provide a new and improved phase sequence sensing circuit.

Another object of this invention is to provide a new and improved static phase sequence sensing circuit.

A further object of this invention is to provide a new and improved static phase sequence sensing circuit in which the circuit discriminates between normal phase rotation, open or reverse phases.

A still further object of this invention is to provide a new and improved phase sequence sensing circuit in which a capacitor is used to discriminate between different phase conditions.

Other objects and advantages of this invention will become apparent from the following description taken in connection with the accompanying drawing wherein are set forth by way of illustration and example certain embodiments of this invention.

Figure 1:
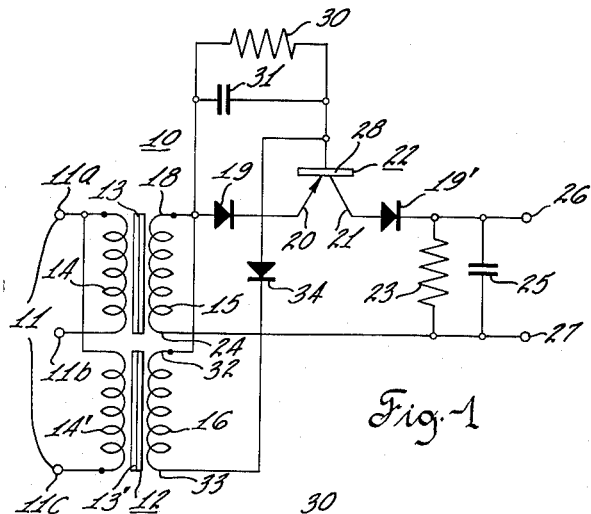
FIG. 1 is a schematic drawing of a phase sequence sensing circuit and embodying the invention.

Referring more particularly to the drawing wherein like parts are designated by like characters of reference throughout the figures, FIG. 1 illustrates a phase sequence sensing circuit 10 which is utilized for sensing electrical conditions in a three phase power source 11 having terminals 11a, 11b and 11c. The phase sequence sensing circuit 10 senses the power source 11 through a transformer 12 which is electrically associated therewith. Transformer 12 comprises cores 13 and 13', a pair of input or primary windings 14, 14' connected across the three phase power source 11, as shown, and a pair of secondary windings 15 and 16. Terminal 18 of secondary winding 15 is connected through a diode 19, two elements 20 and 21 of a semiconductor 22 and a diode 19' to one side of a load such as resistor 23. The other terminal 24 of secondary winding 15 is connected to the other side of resistor 23. An integrating capacitor 25 shunts resistor 23. Output terminals 26 and 27 are arranged across the parallel arrangement of resistor 23 and capacitor 25 as shown in FIG. 1.

The semiconductor 22 may comprise a transistor wherein elements 20 and 21 are respectively the emitter and collector elements thereof. The third element of the transistor, namely base element 28, is connected through a parallel arrangement of a resistor 30 and a capacitor 31 to terminal 18 of secondary winding 15 and to terminal 32 of secondary winding 16 as shown. The other terminal 33 of the secondary winding 16 is connected through a diode 34 to base element 28 in the manner shown.

Figure 2:
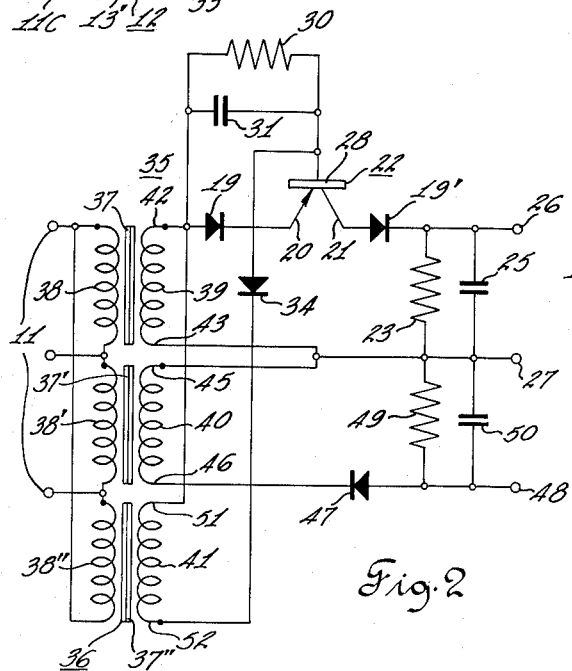
FIG. 2 is a modification of the phase sequence sensing circuit shown in FIG. 1.

FIG. 2 illustrates a modification of the circuit shown in FIG. 1 wherein like components in similar circuit arrangements are provided with the same reference characters. More particularly, FIG. 2 illustrates a phase sequence sensing circuit 35 for sensing the electrical condition in the three phase power source 11. Transformer 36 comprises cores 37, 37' and 37'', three input or primary windings 38, 38' and 38'' connected across the three phase power source 11, as shown, and three secondary windings 39, 40 and 41. Terminal 42 of secondary winding 39 is connected through diode 19, emitter element 20, collector element 21 of transistor 22 and diode 19' to one side of load resistor 23 in the same manner as shown in FIG. 1. The other terminal 43 of secondary winding 39 is connected to the other side of resistor 23. Integrating capacitor 25 shunts resistor 23, and output terminals 26 and 27 are arranged across the parallel arrangement of resistor 23 and capacitor 25, as shown. Base element 28 of transistor 22 is connected through the parallel arrangement of resistor 30 of secondary winding 39, as shown.

Terminal 45 of secondary winding 40 is connected to terminal 43 of secondary winding 39 and to resistor 23 and terminal 27, as shown. The other terminal 46 of secondary winding 40 is connected through a diode 47 to an output terminal 48. A load resistor 49 and an integrating capacitor 50 are connected in parallel and across terminals 27 and 48. Terminal 51 of secondary winding 41 is connected to terminal 42 of secondary winding 39. Terminal 52 of secondary winding 41 is connected through diode 34 to the base element 28 of transistor 22.

Figure 3:
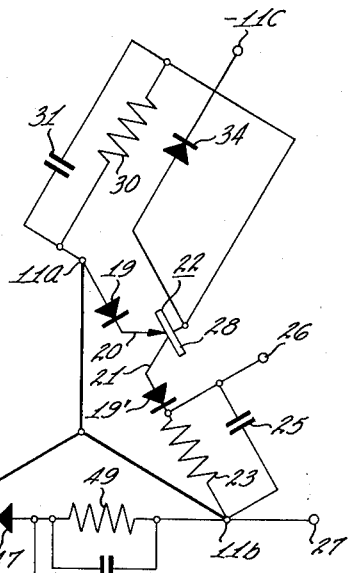
FIG. 3 is a vectorial illustration of the electrical conditions illustrated in FIGS. 1 and 2 with the circuit elements shown in their relative phase relationships.

FIG. 3 illustrates a vectorial circuit diagram of the phase sequence arrangements shown in FIGS. 1 and 2. In the three phase system shown phase to phase voltage 11b—11a is applied to the series circuit formed by diode 19, emitter element 20 and collector element 21 of transistor 22, diode 19′ and load resistor 23. Capacitor 25 is connected in parallel with resistor 23. The voltage 11b—11a is shown in FIG. 4 as a sinusoidal voltage marked 11b—11a.

The inverted voltage between the 11a—11c phase and its phase relation is lagging 60 degrees behind the voltage between the 11b—11a phase. This voltage is applied, as shown in FIG. 3, between the emitter element 20 and the base element 28 of transistor 22 and in series with diodes 19 and 34. Connected in parallel with diode 19 and base element 28 is resistor 30 and capacitor 31.

Figure 4:
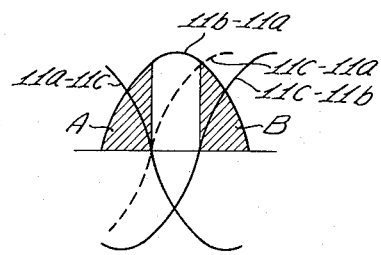
FIG. 4 is a graph showing the relationship of the sinusoidal voltage involved.

In FIG. 4 voltage 11a—11c is reversed and appears as voltage 11c—11a. This voltage passes from negative to positive at the time voltage 11b—11a is positive. Area marked A in FIG. 4 illustrates a time during which transistor 22 is conductive and charges capacitor 25 through diode 19′. Capacitor 31 acts to prolong the negative charge on base element 28 of transistor 22 so that area A is extended to cover the zone shown under the sinusoidal curve shown in FIG. 5. This is the voltage which may be measured by means of an oscilloscope across the terminals 26, 27 if for purposes of this measurement the integrating capacitor 25 has been disconnected.

Figure 5:
FIG. 5 is a graph showing the output voltage curve when the phase sequences and voltage condition of the circuits shown in FIGS. 1 and 2 are properly connected.
Figure 6:
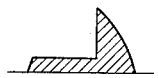
FIG. 6 is a graph showing the output voltage curve when the phase sequences and voltage condition of the circuits shown in FIGS. 1 and 2 are improperly connected.

If the phase voltages are changed or reversed the condition will develop illustrated by area B in FIG. 4. Transistor 22 becomes conductive when the potential of emitter element 20 and collector element 21 approaches zero potential. Under such conditions voltage 11c—11b is actually applied to the base element 28 of transistor 22. In this case, the prolongation of the negative charge on the base element 28 of transistor 22 by capacitor 31 is without any effect because of the approaching voltage zero on the emitter and collector elements. The result of such a phase reversal is shown in FIG. 6 providing capacitor 25 has been disconnected for the purpose of this measurement. The area under the curve in FIG. 6 is much smaller than under the curve shown in FIG. 5 and can be readily shown on a volt meter or other suitable measuring device. It is conceivable that the apparent instantaneous voltage amplitude across terminals 26, 27 and as illustrated in FIGS. 5 and 6 can be detected sequentially by a direct sensing high speed discriminating circuit, but the simplest and most effective method uses the integrating capacitor 25 which reduces the output signal of this circuit to a simple direct voltage level difference, thus making it possible with the disclosed circuits in FIGS. 1 and 2 to detect phase rotation and phase interruption.

In FIG. 2, diode 47, resistor 49 and capacitor 50 are energized by the 46—11b voltage which has essentially the same phase relationship as the 11c—11b phase voltage. Capacitor 50 is charged by diode 47 to a value which corresponds to the phase to phase voltage between terminals 46 and 11b. This 46—11b voltage is added to the voltage which is built up on capacitor 25 by the action of transistor 22 and which when the latter is fully conducting essentially amounts to the voltage between the 11b—11a phase. Since with the help of two phase to phase voltages, under or over voltages in a three phase delta system can be correctly detected, the circuit shown in FIG. 2 will function also as an over voltage or under voltage sensing circuit in addition to its phase sequence sensing features. If any one of the three phases is interrupted the circuit will also function as an open phase sensing circuit in the manner previously explained. When the phase sequences are correct, the phase voltages are of a predetermined value and no open circuits occur in any of the phases, the output voltage across terminals 26, 27 and 27, 48 will be of a maximum value. If any of these conditions are improper the output voltage across terminals 26, 27 and 48 will be less than the maximum value and detectable by suitable measuring devices such as a volt meter or an oscilloscope.

Although but two embodiments of the present invention have been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. A phase sequence sensing circuit for an electrical source having first, second and third voltage terminals forming three different pairs of terminals, means for sensing the voltage difference between at least two pairs of said voltage terminals comprising a load connected between at least one pair of said two pairs of said terminals, a controllable semiconductor comprising at least three elements, means for connecting two of said elements in series with said load, means for connecting one terminal of said third pair of terminals to said third element, and time delay means connected between said third element and the other terminal of said third pair of terminals for controlling said load in accordance with circuit conditions.

2. A phase sequence sensing circuit for an electrical source having first, second and third voltage terminals forming three different pairs of terminals, means for sensing the voltage difference between at least two pairs of said voltage terminals comprising a load connected between at least one pair of said two pairs of said terminals, a controllable semiconductor comprising at least three elements, means for connecting two of said elements in series with said load, means for connecting one terminal of said third pair of terminals to said third element, and capacitive means connected between said third element and the other terminal of said third pair of terminals for controlling said load in accordance with circuit conditions.

3. A phase sequence sensing circuit for an electrical source having first, second and third voltage terminals forming three different pairs of terminals, means for sensing the voltage difference between at least two pairs of said voltage terminals comprising a load connected between at least one pair of said two pairs of said terminals, a controllable semiconductor comprising at least three elements, means for connecting two of said elements in series with said load, means for connecting one terminal of said third pair of terminals to said third element, and capacitive means detachably connected between said third element and the other terminal of said third pair of terminals for controlling the voltage across said load in accordance with circuit conditions.

4. A phase sequence sensing circuit for an electrical source having first, second and third voltage terminals forming three different pairs of terminals, means for sensing the voltage difference between two pairs of said voltage terminals comprising a load connected between at least one pair of said two pairs of said terminals, a controllable semiconductor comprising an emitter electrode, a collector electrode and a base electrode, means for connecting said emitter electrode and said collector electrode in series with said load, means for connecting one terminal of said third pair of terminals to said base electrode, and capacitive means connected between said base electrode and the other terminal of said third pair of terminals for controlling the voltage across said load in accordance with circuit conditions.

5. A phase sequence sensing circuit for an electrical source having first, second and third voltage terminals forming three different pairs of terminals, means for sensing the voltage difference between different pairs of said voltage terminals comprising a resistance load connected between two pairs of said terminals, a controllable semiconductor comprising at least three elements, means for connecting two of said elements in series with said load and across one of said two pairs of said terminals, means for connecting one terminal of said third pair of terminals to said third element, and capacitive means connected between said third element and the other terminal of said third pair of terminals for controlling the voltage across said load in accordance with circuit conditions.

6. A phase sequence sensing circuit for an electrical source having first, second and third voltage terminals forming three different pairs of terminals, means for sensing the voltage difference between at least two pairs of said voltage terminals comprising a load connected between at least one pair of said two pairs of said terminals, a controllable semiconductor comprising at least three elements, means for connecting two of said elements in series with said load, means for connecting one terminal of said third pair of terminals to said third element, capacitive means detachably connected between said third element and the other terminal of said third pair of terminals for controlling said load, and an output circuit connected across said load for indicating the phase sequence of the three phase circuit in accordance with circuit conditions.

No references cited.